(12) United States Patent
Li et al.

(10) Patent No.: US 11,669,215 B2
(45) Date of Patent: Jun. 6, 2023

(54) COMPUTING DEVICE IDENTIFIER RETRIEVAL

(71) Applicant: Future Dial, Inc., Sunnyvale, CA (US)

(72) Inventors: Jisheng Li, Los Altos, CA (US); George Huang, Los Altos Hills, CA (US)

(73) Assignee: Future Dial, Inc., Sunnyvale, CA (US)

(*) Notice: Subject to any disclaimer, the term of this patent is extended or adjusted under 35 U.S.C. 154(b) by 127 days.

(21) Appl. No.: 17/019,008

(22) Filed: Sep. 11, 2020

(65) Prior Publication Data

US 2022/0083800 A1 Mar. 17, 2022

(51) Int. Cl.
*G06F 3/0481* (2022.01)
*G06V 10/22* (2022.01)
*G06F 40/174* (2020.01)
*G06V 30/10* (2022.01)

(52) U.S. Cl.
CPC .......... *G06F 3/0481* (2013.01); *G06F 40/174* (2020.01); *G06V 10/225* (2022.01); *G06V 30/10* (2022.01)

(58) Field of Classification Search
CPC .............................. G06F 3/0481; G06V 10/225
See application file for complete search history.

(56) References Cited

U.S. PATENT DOCUMENTS

| | | | |
|---|---|---|---|
| 2015/0262348 A1* | 9/2015 | Salzman | G06T 7/0004 348/94 |
| 2016/0227109 A1* | 8/2016 | Mattes | G06Q 20/4014 |
| 2017/0109594 A1* | 4/2017 | Sahagun | G06F 3/0482 |
| 2017/0118374 A1* | 4/2017 | Tsujiguchi | G06F 3/147 |
| 2017/0235444 A1* | 8/2017 | Zhang | G06F 16/9577 715/758 |
| 2017/0244850 A1* | 8/2017 | Ishitori | G06V 30/412 |
| 2019/0227306 A1* | 7/2019 | Greenberger | G06V 20/10 |
| 2020/0293535 A1* | 9/2020 | Davis | F24F 11/64 |
| 2021/0279961 A1* | 9/2021 | Watanabe | G06T 13/40 |

FOREIGN PATENT DOCUMENTS

CN 112394864 A * 2/2021 ........... G06F 3/0484

\* cited by examiner

*Primary Examiner* — Mong-Shune Chung
(74) *Attorney, Agent, or Firm* — Greenberg Traurig

(57) ABSTRACT

A method includes receiving, by a processing device, an indication of an application being opened. In response to receiving the indication, the method includes retrieving, from a storage connected to the processing device, a last captured photo. For the last captured photo as retrieved, the method includes extracting a device identifier from the last captured photo by the processing device. The extracted device identifier is stored in the storage.

12 Claims, 5 Drawing Sheets

US 11,669,215 B2

COMPUTING DEVICE IDENTIFIER RETRIEVAL

FIELD OF THE TECHNOLOGY

At least some embodiments disclosed herein relate generally to retrieval of computing device identifiers. More particularly, the embodiments relate to systems and methods for automated retrieval and input of computing device identifiers.

BACKGROUND

Computing devices (e.g., mobile devices such as cellular telephones, tablets, etc.) generally include a plurality of identifiers. Although these identifiers are generally viewable via one or more graphical user interfaces (GUIs), they are generally not retrievable via an application running on the computing device.

SUMMARY

A method is disclosed. The method includes receiving, by a processing device, an indication of an application being opened. In response to receiving the indication, the method includes retrieving, from a storage connected to the processing device, a last captured photo. For the last captured photo as retrieved, the method includes extracting a device identifier from the last captured photo by the processing device. The extracted device identifier is stored in the storage.

A system is disclosed. The system includes a processing device configured to receive, by a processing device, an indication of an application being opened. In response to receiving the indication, the processing device retrieves, from a storage connected to the processing device, a last captured photo. For the last captured photo as retrieved, the processing device extracts, a device identifier from the last captured photo. The processing device stores the extracted device identifier in the storage.

BRIEF DESCRIPTION OF THE DRAWINGS

References are made to the accompanying drawings that form a part of this disclosure and illustrate embodiments in which systems and methods described in this Specification can be practiced.

Like reference numbers represent like parts throughout.

DETAILED DESCRIPTION

Computing devices such as, but not limited to, smartphones, tablets, laptops, smartwatches, and the like, include device identifiers corresponding to a computing device. In some cases, the device identifiers may be unique and associated with a particular computing device. In other cases, the device identifier may be descriptive of a computing device, but not unique relative to other computing devices.

Many of the device identifiers for computing devices include a string that includes a combination of letters (A-Z) and numbers (0-9) and can contain. The identifiers may contain other characters (e.g., special characters such as, but not limited to, $, !, ?, @, etc.). The character types are examples and are not intended to be limiting. Example device identifiers include, for example, IMEI, MEID, Serial Number, MAC address, model, number, etc. It is to be appreciated that this list is an example and that any identifier that is included in, for example, an "About" interface of the computing device is considered to be within the scope of a "device identifier."

In some cases, device identifiers are viewable for the computing device, but not capable of being pulled and utilized by applications running on the computing device. In such cases, to use the device identifiers, a user is required to view and record or remember the device identifier and then input that device identifier into an application. This is often not practical, as the device identifiers can include a long string of characters, which causes the entry to be error-prone.

While this disclosure makes reference to unique identifiers, it is to be appreciated that one or more of the identifiers of a computing device need not be unique. The identifiers can be retrieved via the systems and methods described herein.

Embodiments described herein are directed to a system and method for retrieving identifying information about a computing device. In an embodiment, the computing device is running a mobile operating system such as, but not limited to, iOS or Android. The method includes displaying, for a user, a guide to capture a screenshot of a device information page including the identifying information. In response to a user returning to the application, a most recently captured image in the device's photo storage is retrieved and the identifying information is extracted (e.g., via OCR) from the most recently captured image and automatically entered into an input field.

Figure 1:
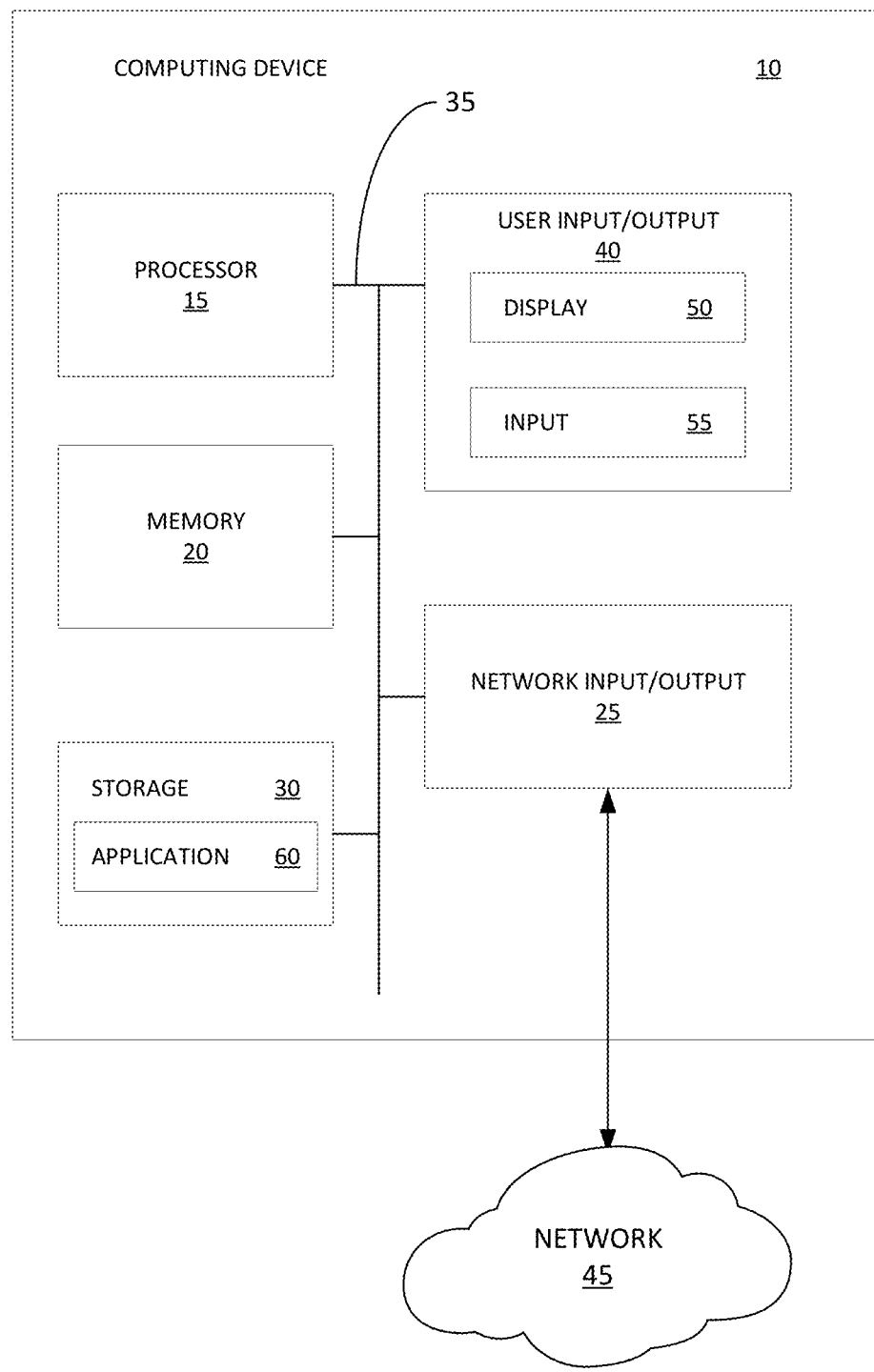
FIG. 1 shows a computing device, according to an embodiment.

FIG. 1 shows a computing device 10, according to an embodiment. The computing device 10 and any of the individual components thereof can be used for any of the operations described in accordance with any of the methods described herein.

The computing device 10 includes a processor 15, a memory 20, a network input/output (I/O) 25, a storage 30, an interconnect 35, and a user input/output 40. The computing device 10 can be in communication with one or more additional computing devices 10 through a network 45.

The computing device 10 can be representative of a mobile computing device such as, but not limited to, a cellular phone, a tablet, a smartwatch, a personal digital assistant (PDA), a video game console, a television, or the like. The computing device 10 can be in communication with another computing device 10 through the network 45. The computing devices 10 in communication can be different types of devices. For example, in an embodiment, a server can be connected in communication with the computing device 10 via the network 45.

The processor 15 can retrieve and execute programming instructions that are stored in the memory 20, the storage 30, or combinations of the memory 20 and the storage 30. For example, the storage 30 can include an application 60. The application 60 can, when executed, cause the processor 15 to perform a method (FIG. 2) to retrieve a device identifier from a screenshot captured by a user of a GUI including the device identifier. The processor 15 can also store and retrieve application data residing in the memory 20. The interconnect 35 transmits programming instructions, application data, or combinations thereof, between the processor 15, the user I/O 40, the memory 20, the storage 30, and the network I/O 25. The interconnect 35 can be one or more busses or the like. The processor 15 can be a single processor, multiple processors, or a single processor having multiple processing cores. In an embodiment, the processor 15 is a single-threaded processor. In an embodiment, the processor 15 is a multi-threaded processor.

The user I/O 40 includes a display 50 and an input 55. In an embodiment, the display 50 and the input 55 are combined (e.g., a touchscreen interface). In an embodiment, the input 55 can include a variety of input devices suitable for receiving an input from the user. Examples of suitable devices include, but are not limited to, keyboard, a voice command, a proximity sensor, an ocular sensing device for determining an input based on eye movements (e.g., scrolling based on an eye movement), or the like.

The memory 20 is generally included to be representative of a random access memory (RAM) such as, but not limited to, Static Random Access Memory (SRAM), Dynamic Random Access Memory (DRAM), or Flash. In some embodiments, the memory 20 can be a volatile memory. In some embodiments, the memory 20 can be a non-volatile memory. In some embodiments, at least a portion of the memory can be virtual memory.

The storage 30 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. The storage 30 can be a computer readable medium. In an embodiment, the storage 30 can include storage that is external to the computer device 10, such as in a cloud.

The network I/O 25 is configured to transmit data via the network 45. The network 45 may be referred to as the communications network 45. Examples of the network 45 include, but are not limited to, a local area network (LAN), a wide area network (WAN), the Internet, or the like. The network I/O 25 can transmit data via the network 45 through a wireless connection using Wi-Fi, Bluetooth, or other similar wireless communication protocols. The computer device 10 can transmit data via the network 45 through a cellular, 3G, 4G, 5G, or other wireless protocol.

Figure 2:
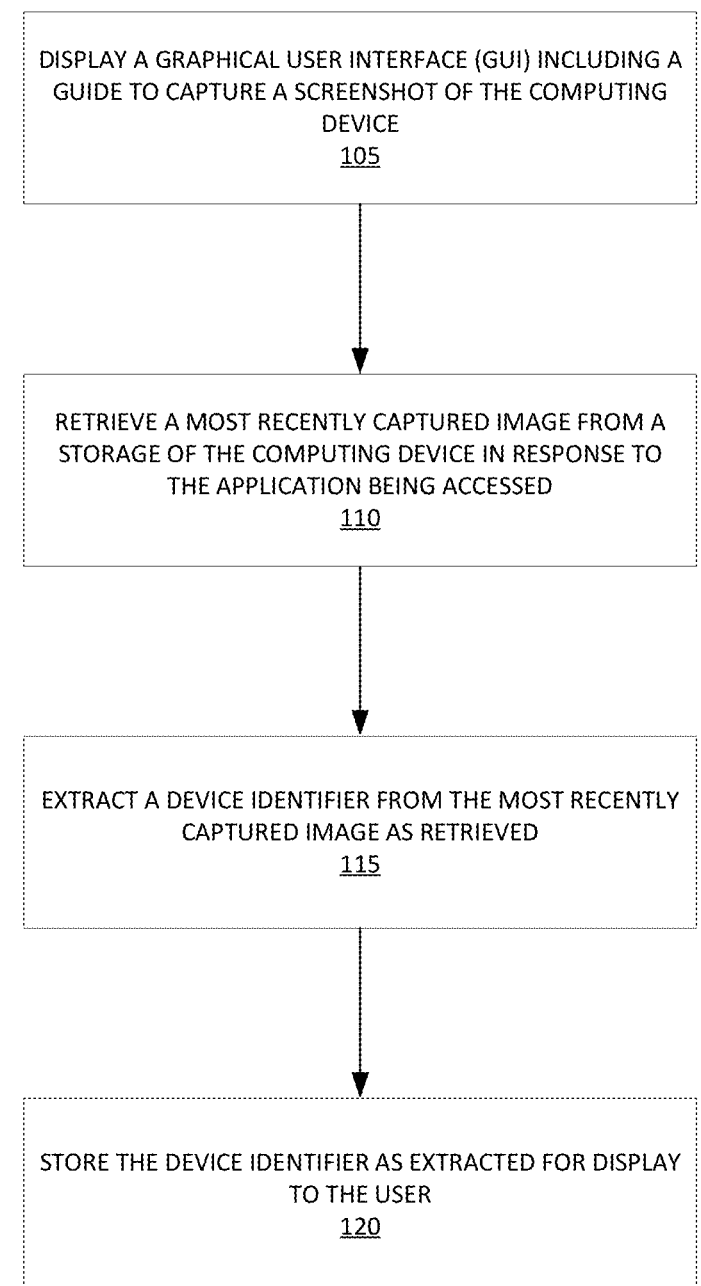
FIG. 2 shows a method for retrieving a device identifier, according to an embodiment.

FIG. 2 shows a method 100 for retrieving a device identifier, according to an embodiment. The method 100 may be embodied as an application stored in a memory 20 (FIG. 1B) or storage 30 for execution by the processor 15.

Figure 3:
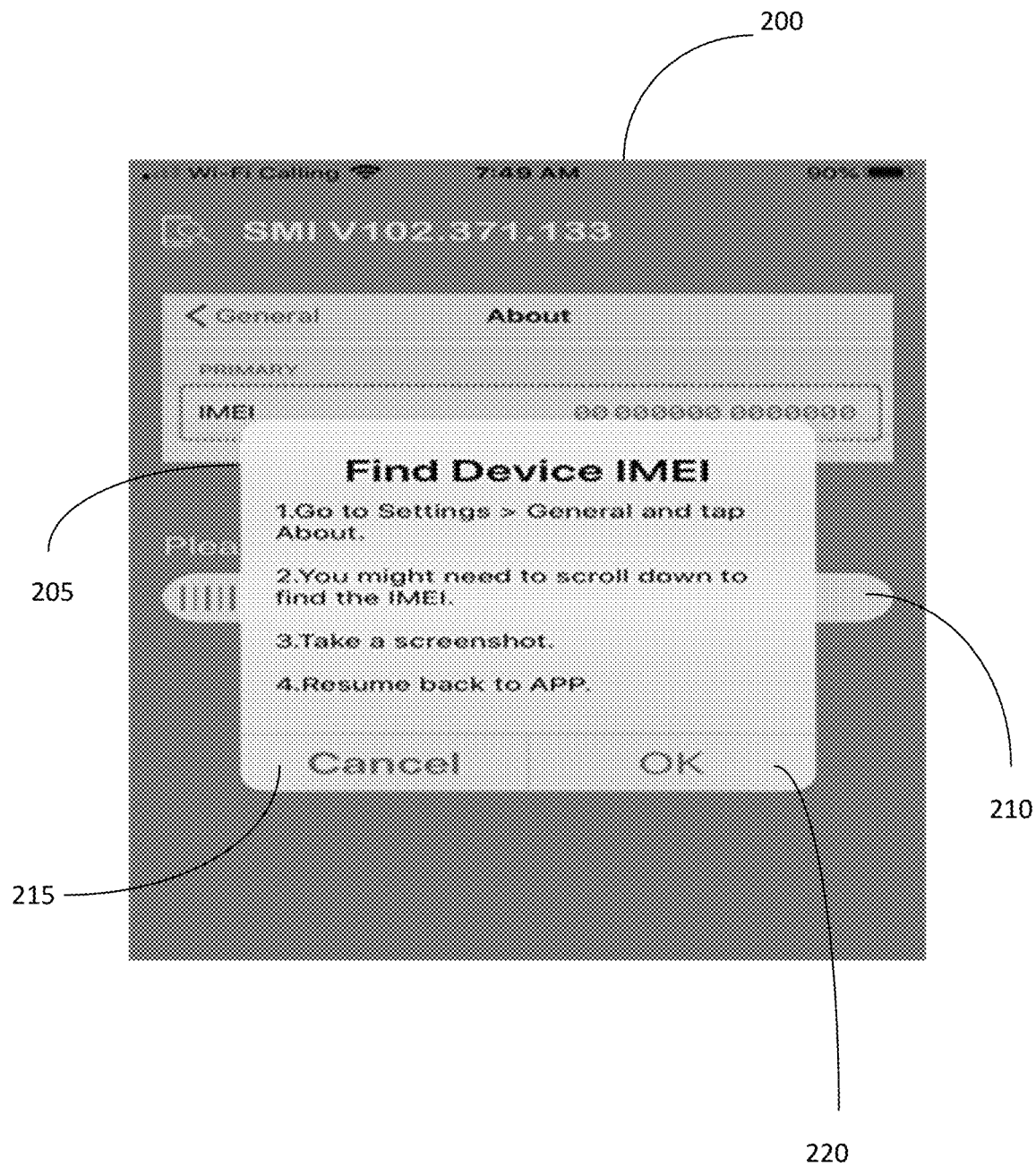
FIG. 3 shows a graphical user interface (GUI) instructing a user to capture an image of an about page of a computing device, according to an embodiment.

The method 100 includes displaying, for a user, a graphical user interface (GUI) including a guide to capture a screenshot of a computing device GUI (e.g., an "About" page including device identifiers) at block 105. An example of the GUI including the guide is shown in FIG. 3 below.

Figure 4:
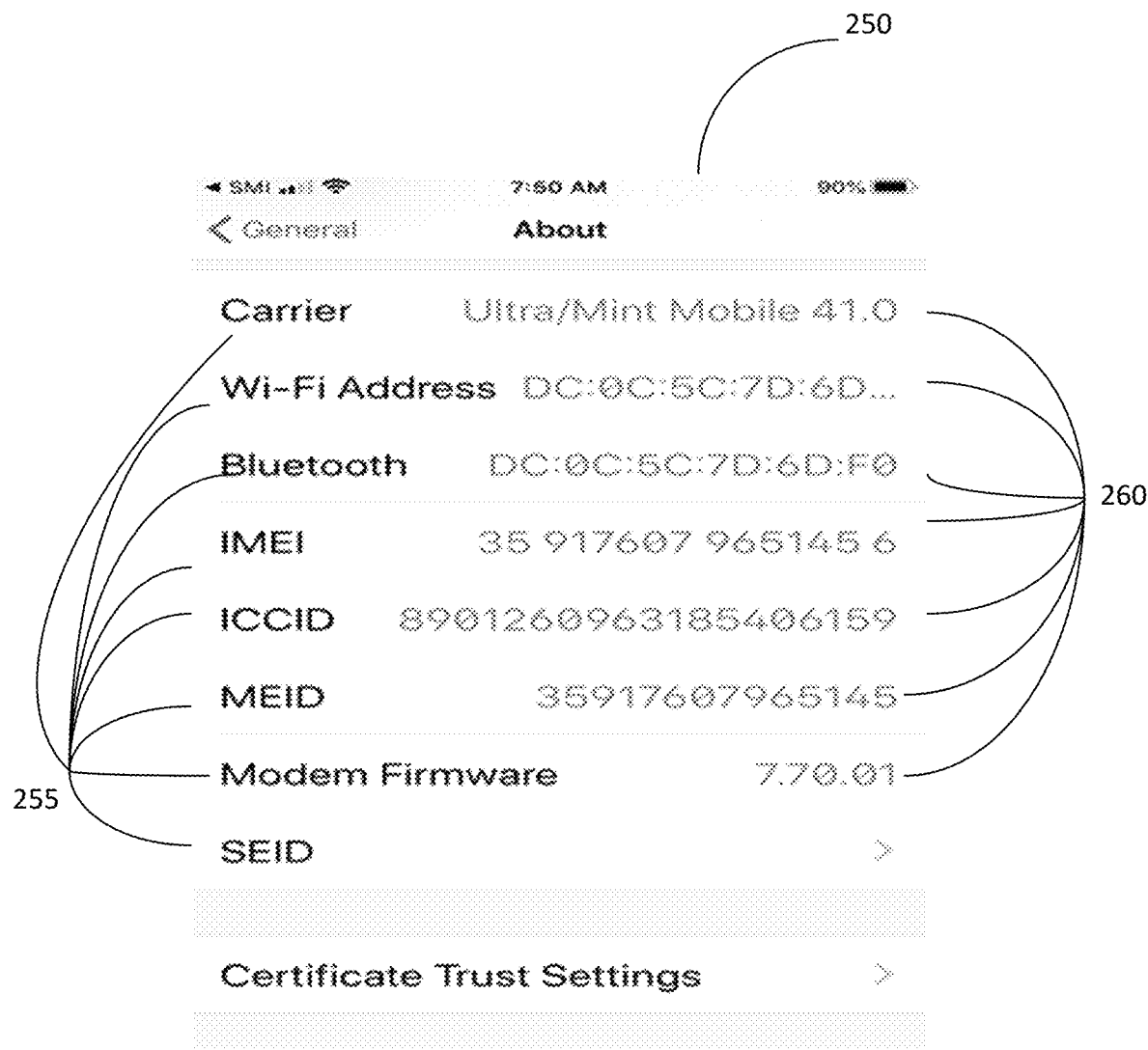
FIG. 4 shows a GUI displaying an about page of a computing device, according to an embodiment.

In an embodiment, to capture the screenshot, the user navigates away from the application for retrieving the device identifier to the "About" GUI of the computing device. In an embodiment, this page can be displayed in a "Settings" menu of the computing device. An example of a screenshot of the "About" GUI of the computing device is shown in FIG. 4. The "About" GUI may include a plurality of device identifiers. In an embodiment, a single device identifier may be desired. In an embodiment, a plurality of device identifiers may be desired. In such an embodiment, the screenshot as captured should include the plurality of device identifiers.

The method 100 includes, in response to a user returning to the application, automatically retrieving a most recently captured image in a storage of the computing device at block 110.

At block 115, a device identifier is extracted from the most recently captured image as retrieved. In an embodiment, the identifying information is extracted using an optical character recognition (OCR) technique. If the method 100 does not identify the device identifier, an error message may be displayed (on a display 50 (FIG. 1)) to the user instructing the user to take another screenshot.

Figure 5:
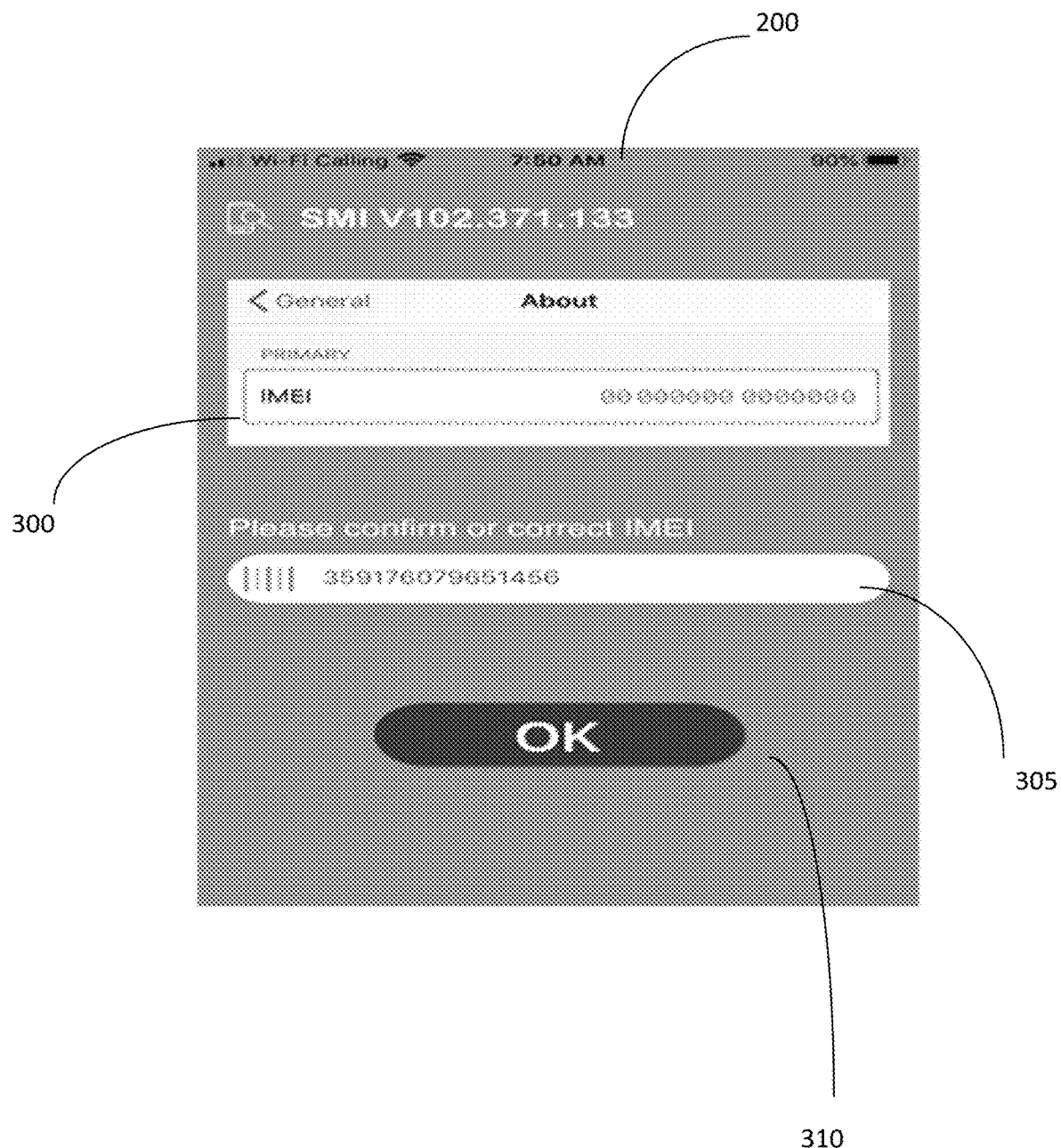
FIG. 5 shows a GUI displaying an entry of a device identifier, according to an embodiment.

At block 120, the device identifier is stored and automatically input into an entry field and displayed for confirmation by the user. An example of the identifier input and displayed for confirmation by the user is shown in FIG. 5 below. In an embodiment, the method 100 can be used to extract a plurality of device identifiers. In such an embodiment, at block 120, the plurality of device identifiers are automatically input into a plurality of entry fields and displayed for confirmation by the user.

In an embodiment, the device identifier may be automatically input into the entry field without displaying for confirmation by the user. In such an embodiment, the application may continue to using the device identifier instead of displaying for the user to verify.

FIG. 3 shows a GUI 200 instructing a user to capture an image of an about page of a computing device, according to an embodiment. The GUI 200 is displayable on the display 50 (FIG. 1) of the computing device 10. The GUI 200 includes a popup message 205 overlaid onto the GUI 200 which includes an input field 210 for entering a device identifier. In the illustrated embodiment, the device identifier to be retrieved and entered is the IMEI for the computing device. It is to be appreciated that this is an example and that other device identifiers can be retrieved and automatically input. The popup message 205 generally includes instructions directing the user to navigate to the "About" GUI for the computing device. The popup message 205 also includes additional information to ensure the user captures a screenshot that includes the appropriate device identifier to prevent error messages. In the illustrated embodiment, the popup message 205 includes a cancel button 215 and an "OK" button 220. In an embodiment, the popup message 205 may not include buttons 215 and 220 or may include only one of the buttons 215 or 220. It is to be appreciated that the text is an example and that the GUI 200 can vary beyond what is shown in FIG. 3.

FIG. 4 shows a GUI 250 displaying an about page of a computing device, according to an embodiment. In the illustrated embodiment, a plurality of descriptors 255 are shown, along with the device identifiers 260 corresponding to each descriptor 255. Additional or other descriptors 255 and accordingly device identifiers 260 may be present. The GUI 250 varies based on the computing device type and the operating system installed.

FIG. 5 shows the GUI 200 of FIG. 3 without the popup message 205, according to an embodiment. The resulting GUI 200 includes a device identifier 300 and a device identifier input 305. The device identifier input 305 includes the device identifier as retrieved (e.g., via the method 100 (FIG. 2)). Once the user reviews the entry, the user can select the button 310. The device identifier 300 in the illustrated embodiment does not display the device identifier as retrieved until after the user selects the button 310 and the device identifier as retrieved is stored in a memory (e.g., the memory 20 or storage 30 (FIG. 1)). In an embodiment, the device identifier 300 can alternatively include the device identifier as retrieved and displayed in the device identifier input 305. In such an embodiment, the device identifier can be stored in the memory as any updates are made in the device identifier input 305 or once the user selects the button 310.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, operations, elements, and/or components, but do not preclude the presence or addition of one or more other features, integers, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method, comprising:
   receiving, by a processing device, an indication of an application being opened;
   in response to receiving the indication, automatically retrieving, by the processing device, from a storage connected to the processing device, a last captured photo;
   for the last captured photo as retrieved, extracting, by the processing device, a device identifier from the last captured photo;
   storing, by the processing device, the extracted device identifier in the storage;
   automatically inputting, by the processing device, the extracted device identifier into an entry field; and
   displaying, on a display, the extracted device identifier as input into the entry field for confirmation by a user.

2. The method of claim 1, wherein extracting the device identifier from the last captured photo comprises an optical character recognition (OCR) technique.

3. The method of claim 1, comprising displaying, on a display, a popup message including instructions for capturing an image of an "about" graphical user interface (GUI) .

4. The method of claim 1, wherein in response to extracting the device identifier being unsuccessful, an error message is displayed on a display.

5. The method of claim 1, wherein the device identifier comprises an IMEI, an MEID, a serial number, a MAC address, a model number, or any combination thereof.

6. The method of claim 1, wherein the extracted device identifier as input on the display is editable.

7. The method of claim 6, comprising, in response to receiving an edit to the device identifier, storing the device identifier as edited in the storage.

8. A system, comprising:
   a processing device configured to:
      receive an indication of an application being opened;
      in response to receiving the indication, automatically retrieve, from a storage connected to the processing device, a last captured photo;
      for the last captured photo as retrieved, extract a device identifier from the last captured photo;
      store the extracted device identifier in the storage;
      automatically input the extracted device identifier into an entry field; and
      display, on a display, the extracted device identifier as input into the entry field for confirmation by a user.

9. The system of claim 8, wherein the processing device is onboard a smartphone.

10. The system of claim 8, wherein the display is configured to display a graphical user interface including a popup message including instructions for capturing an image of an "about" graphical user interface (GUI).

11. The system of claim 8, wherein extracting the device identifier from the last captured photo comprises an optical character recognition (OCR) technique.

12. The system of claim 8, wherein in response to extracting the device identifier being unsuccessful, an error message is displayed on a display.

* * * * *